Sept. 14, 1965
D. C. BENNETT
3,206,160
ELECTROMAGNETIC FLOW CONTROL SYSTEM
Filed March 8, 1962
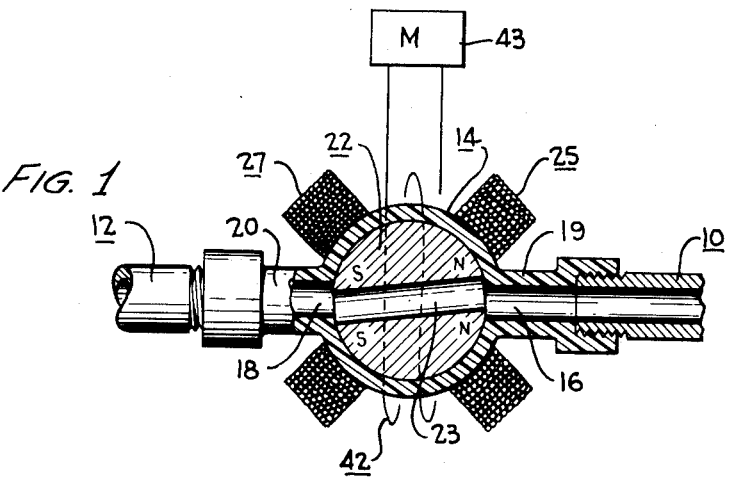
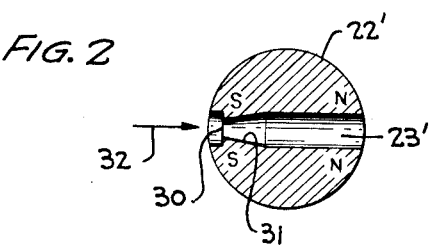
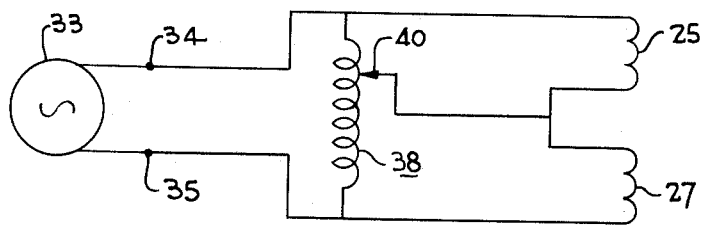
INVENTOR
DONALD C. BENNETT
BY Watson, Cole, Grindle & Watson
ATTORNEYS

United States Patent Office 3,206,160
Patented Sept. 14, 1965

3,206,160
ELECTROMAGNETIC FLOW CONTROL SYSTEM
Donald C. Bennett, 7 Sullivan Way, East Brunswick, N.J.
Filed Mar. 8, 1962, Ser. No. 178,305
12 Claims. (Cl. 251—65)

This invention relates to flow control systems, and more particularly to an improved system for electromagnetically actuating a flow control valve.

Priorly, numerous forms of valve constructions have been employed in which the flow control element was actuated by an electromagnet. Examples of these types of prior art devices are shown in Hoppe Patent 2,056,322 and Hajny Patent 2,902,221. The prior art devices, however, exhibit certain disadvantages. For example, certain of the prior art devices are complex in the mechanical arrangement connecting the electromagnetically operated actuator mechanism and the valve itself. Further, in certain of the prior art devices ball valves are employed in which the ball is displaced from the valve seat by lateral movement of the ball under the influence of an electromagnet. Such an arrangement necessarily requires that the ball be loosely seated in the region of the valve seat. This loose seating arrangement, however, permits movement of the ball in response to the fluid pressure thereby permitting leakage between the ball and ball seat.

Accordingly, it is an object of this invention to provide an improved electromagnetically operated flow control system.

It is another object of this invention to provide an improved electromagnetically operated flow control system employing a ball-type valve.

It is a still further object of this invention to provide an improved flow control valve which is positively seated at all times and is electromagnetically operated by rotation of the valve in the valve seat.

It is another object of this invention to provide an improved flow control system utilizing a ferromagnetic flow control element and a pair of electromagnetic coils positioned with their fields defining angles relative to each other thereby selectively to control the positioning of the flow control element.

It is another object of this invention to provide a flow control system with a ball-type valve and electromagnetic means for selectively rotating the valves into a predetermined one of a number of positions.

It is a still further object of this invention to provide a ferromagnetic ball-type valve with a passage diametrically through the ball and electromagnetic means for rotating the ball into various positions for the controlling of the flow of the fluid without the use of direct mechanical connections.

It is a still further object of this invention to provide a flow control system with a device for producing an electromagnetic field around a fluid conduit and a ferromagnetic ball-type valve seating in a valve chamber within the field of the electromagnetic device, which ball has a passage diametrically therethrough and a constriction in the passage to aid the movement of the ball to a predetermined one of its positions.

It is a still further object of this invention to provide an electromagnetically operated ferromagnetic ball-type valve with a pair of electromagnets for selectively rotating the ball through a predetermined angle, which electromagnetic devices are connected in a balancing circuit for controlling the relative currents through the electromagnetic devices.

Briefly, in accordance with aspects of this invention, a conduit is provided with a valve housing and a ball-type valve mounted within the housing to prevent diametrical movement of the ball relative to the housing. The housing is preferably of non-magnetic material, while the ball is of ferromagnetic material. For example, the ball may be of suitable ferromagnetic material having a high coercive force and B-H product. Advantageously, the ball has a passage preferably diametrically through the ball and the ball is magnetized in a direction parallel to the passage. Also advantageously, a pair of coils encircle the valve housing and these coils are positioned at angles relative to each other. Preferably, their relative position is 90° apart. Also preferably, each of the coils is positioned with its axis disposed at an angle of 45° relative to the axis of the conduit. In response to energization of the coils the ball valve assumes positions corresponding to the axis of the resultant magnetic field thus controlling the fluid flow through the ball.

In accordance with other aspects of this invention, the ball valve is provided with a passage diametrically therethrough, which passage has a restriction adjacent one end thereof to aid in the rotation of the ball toward a predetermined flow control position. In the preferred embodiment this restriction is positioned adjacent the inlet side of the valve such that the restriction and the force developed by the fluid on this restriction aids in the movement of the valve toward its closed position.

In accordance with still other aspects of this invention, the angularly disposed electromagnetic coils are connected in series across the line from a supply source and the common connection of the two coils is connected to a controllable voltage divider. Increasing the potential applied across one of the coils decreases the potential applied across the other of the coils. Changing the relative current through the coils causes a shift in the resultant magnetic field to produce rotation of the ball valve in the ball seat without displacement of the valve relative to the seat.

These and various other objects and features of the invention will be more clearly understood from a reading of the detailed description of the invention, in which:

FIGURE 1 is a plan view, partly in section, of one illustrative embodiment of this invention;

FIGURE 2 is a view, in section, of another ball valve according to this invention; and FIGURE 3 is a schematic representation of a circuit arrangement for the electromagnetic coils of FIGURE 1.

Referring now to FIGURE 1, there is depicted a plan view, partly in section, of a flow control system according to this invention. As therein depicted, a conduit 10 communicates to a similar conduit 12 through a valve housing 14. Advantageously, the valve housing 14 is in the form of a sphere with the exception of the passages 16 and 18 which communicate through short lengths of conduit 19 and 20 with conduits 10 and 12. The housing 14 is formed of nonmagnetic material which, in this particular example, is plastic. A ball valve 22 is positioned in housing 14 with sufficient clearance to be rotated to control the fluid flow and is provided with a fluid passage 23 preferably diametrically therethrough. A pair of electromagnet coils 25 and 27 encircle the housing 14 with their axes at right angles to each other. These coils are energized to control the rotation of ball valve 22 in a manner which will be subsequently described.

Advantageously, the ball valve 22 is formed of ferromagnetic material with a high coercive force and B-H product. Alternatively, the ball may be formed of other materials having ferromagnetic material imbedded therein. The ball is magnetized in a direction parallel to the passage 23 in the preferred embodiment. Since the ball is magnetized and is free to rotate within the housing 14, it will rotate to align itself with the magnetic field of the coils 25 or 27, whichever is energized, or to align itself in a resultant direction depending upon the relative energization of the two coils. When the coils are energized by alternating current, the ball will rotate to a direction parallel to the direction of the resultant field. For example, when coil 27 is energized, the ball 22 will rotate to a direction in which the passage 23 will be coaxial with the axis of coil 27, which position will prevent the flow of fluid from conduit 10 to conduit 12. If, however, both coils 25 and 27 are energized, ball 22 will assume a position in which passage 23 is aligned with conduits 10 and 12 to produce a "valve open" condition.

Advantageously, this type of ball valve may be employed in installations in which the leakage of fluids would be extremely hazardous and/or costly, for example, in conduits for transmitting radioactive fluids, toxic chemicals, or fluids under extremely high pressures. This type of valve is also very useful where positive opening and closing of the conduit is required. Since the ball is firmly seated at all times and fluid pressure will cause the ball to seat more tightly, no leakage will take place around the ball.

Referring now to FIGURE 2, there is depicted a view in section of another illustrative embodiment of the ball valve showing a ball 22' with a passage 23' diametrically therethrough. Advantageously, the passage 23' includes a restriction defined by a shoulder 30 and a subsequent frusto-conical passage 31. If the flow through the ball 22' is in a direction indicated by arrow 32 and the valve is rotated slightly, an unbalanced fluid force will be developed upon the shoulder 30. This unbalanced force will tend to aid the rotation of the ball to a valve closed position. Conversely, if the shoulder 30 is at the downstream end of the ball and the resultant electromagnetic field is rotated, the force of the fluid on the shoulder will cause the valve to tend to open.

Referring now to FIGURE 3, there is depicted, in schematic form, one circuit for use in combination with the coils 25 and 27. As therein depicted, alternating current source 33 is connected to terminals 34 and 35 of variable auto-transformer 38. The ends of the winding of transformer 38 are connected to one terminal of coils 25 and 27. Sliding contact 40 of transformer 38 is connected to the other ends of coils 27 and 25. Thus, it will be apparent that movement of the sliding contact 40 will control the relative currents through the coils 25 and 27 and thus control the resultant strength of the magnetic field of these coils. As mentioned previously, it is the resultant field strength which controls the position of the ball valve 22. For example, if the contact 40 is moved upwardly, as viewed in FIGURE 3, the current through coil 25 will be decreased and the current through coil 27 will be increased. Under these conditions, the ball 22, as viewed in FIGURE 1, will tend to rotate in a counterclockwise direction. If the contact 40 is moved downwardly, as viewed in FIGURE 3, current in coil 25 will increase and the current through coil 27 will decrease. If the contact 40 is moved to the midpoint of the transformer 38, then equal current will flow through coils 25 and 27 and the ball 22, in FIGURE 1, will be positioned with the passage 23 aligned with conduits 10 and 12, thus the valve will be in its open condition.

A novel combination of elements may advantageously be employed to measure fluid flow merely by the addition of coil 42 and meter 43 to the embodiment previously described and shown FIGURE 1. A change in the rate of fluid flow will be accomplished by a change in current through the meter 43, as will be subsequently described. There are three magnetic fiields interacting, the two alternating current magnetic fields of coils 25 and 27 and the direct current field produced by the ferromagnetic ball 22. If the circuit of FIGURE 3 is employed to energize coils 25 and 27 and the setting of contact 40 of transformer 38 is fixed at any given point, the resultant field in the assembly is unique for that setting of contact 40 and fluid flow rate. If the ball of FIGURE 2 is substituted in the housing 14 of FIGURE 1, a surge of fluid from conduit 12 will cause the ball rotation in a direction tending to close the valve, thus altering the field linking the coils 27, 25, and 42. This change in field will induce a change in the lines of flux linking coil 42 which will cause a change in current to be indicated on meter 43. Advantageously, meter 43 may be calibrated in terms of flow rate.

While I have shown and described certain illustrative embodiments of this invention, it will be understood by those skilled in the art that the concepts involved therein may be applied to other embodiments without departing from the spirit and scope of this invention. For example, although the coils 25 and 27 are positioned with their axes perpendicular and with the included angle bisected by the conduits 19 and 20, other angular positions might be employed. Still further, a direct current source and a pair of rheostats may be substituted in the circuit of FIGURE 3 for the alternating current source and the variable transformer 38, respectively.

What is claimed is:

1. An electromagnetic fluid control system comprising a housing, said housing having a substantially spherical interior wall, a magnetized ferromagnetic ball valve rotatably mounted in said housing and having a fluid passage therethrough, a plurality of conduits connected to said housing and communicating with the interior thereof and electromagnetic means operatively positioned adjacent said housing for rotating said ball valve.

2. The system according to claim 1 wherein at least two of said conduits are axially aligned and wherein said fluid passage is diametrical with respect to said ball valve.

3. The system according to claim 2 wherein said ball valve is magnetized in a direction parallel to said fluid passage.

4. The system according to claim 3 wherein said electromagnetic means includes a pair of coils each encircling said housing, said coils being positioned at an angle relative to each other.

5. The system according to claim 4 wherein said coils are positioned with their axes perpendicular to each other and wherein said conduits bisect the included angle between said coils.

6. The system according to claim 5 wherein said passage has a constriction therein to aid the rotation of said ball into one of its terminal positions by developing an unbalanced fluid pressure on said constriction.

7. The system according to claim 5 wherein said coils are connected in series and further including an alternating current source, an auto-transformer connected across said source, one terminal of each of said coils being connected to one end of said auto-transformer and the other end of each of said coils being connected to a connection intermediate the ends of said auto-transformer.

8. The system according to claim 7 wherein said ball valve has a constriction therein to facilitate the rotation of said ball to one of its terminal positions.

9. The system according to claim 8 wherein said constriction is on the upstream side of said passage whereby the fluid pressure developed on said constriction aids in the movement of said valve to the closed position.

10. The system according to claim 8 wherein said constriction is on the downstream side of said passage whereby an unbalanced fluid pressure is developed as the valve is rotated to its open position, which unbalanced force tends to rotate the valve to a valve open position.

11. A fluid flow responsive system comprising a pair of conduits, a substantially spherical housing communicating with said conduits, a spherical magnetized ball valve positioned in said housing with sufficient clearance to permit rotation of said ball valve relative to said housing, a passage through said ball valve and electromagnetic means encircling said housing and positioned to rotate said ball valve relative to said housing in response to the energization of said electromagnetic means.

12. The system according to claim 11 wherein said ball valve has a constriction in said passage and wherein said system further includes a sensing coil encircling said housing, and a meter connected to said sensing coil for detecting the rate of fluid flow through said conduits by indicating the magnitude of electrical current induced in said sensing coil from said electromagnetic means.

References Cited by the Examiner

UNITED STATES PATENTS

| | | | |
|---|---|---|---|
| 2,569,800 | 10/51 | Cataldo | 251—65 XR |
| 3,134,404 | 5/64 | Ziccardi | 251—139 X |

FOREIGN PATENTS

| | | |
|---|---|---|
| 106,600 | 6/27 | Austria. |
| 7,747 | 11/95 | Sweden. |
| 55,499 | 4/11 | Switzerland. |

M. CARY NELSON, *Primary Examiner.*

MARTIN P. SCHWADRON, *Examiner.*